United States Patent [19]

Itoh et al.

[11] Patent Number: 5,232,997

[45] Date of Patent: Aug. 3, 1993

[54] METHOD FOR THE PREPARATION OF AN ACRYLIC POLYMER MODIFIED WITH AN ORGANOPOLYSILOXANE

[75] Inventors: Kunio Itoh; Motoo Fukushima; Toshio Ohba, all of Annaka; Hiroyuki Ohata, Takefu; Harukazu Okuda, Sabae, all of Japan

[73] Assignees: Shin-Etsu Chemical Co., Ltd., Tokyo; Nisshin Chemical Industry Co., Ltd., Takefu, both of Japan

[21] Appl. No.: 670,276

[22] Filed: Mar. 15, 1991

Related U.S. Application Data

[63] Continuation of Ser. No. 154,899, Feb. 11, 1988, abandoned.

Foreign Application Priority Data

[30] Dec. 2, 1987 [JP] Japan .................................. 62-33927

[51] Int. Cl.⁵ .................................................. C08F 283/12
[52] U.S. Cl. ................................ 525/477; 525/479; 528/26; 528/30; 528/32; 528/37
[58] Field of Search .................. 528/26, 30, 32, 37; 525/479, 477

[56] References Cited

U.S. PATENT DOCUMENTS

| | | | |
|---|---|---|---|
| Re. 30,431 | 11/1980 | Falender et al. | 525/479 |
| 3,532,729 | 10/1970 | Cekada et al. | 525/479 |
| 3,627,836 | 12/1971 | Getson | 525/479 |
| 4,070,414 | 11/1978 | Falender et al. | 525/479 |
| 4,725,630 | 2/1988 | Magee et al. | 522/99 |

*Primary Examiner*—Ralph H. Dean, Jr.
*Attorney, Agent, or Firm*—Wyatt, Gerber, Burke & Badie

[57] ABSTRACT

An acrylic rubbery polymer having remarkably improved cold resistance can be prepared by modification with an organopolysiloxane by the emulsion copolymerization of a monomeric mixture of two acrylic monomers, of which one is, for example, an alkyl acrylate and the other is an acrylic compound having, in a molecule, at least one ethylenically unsaturated group other than acrylic group in an aqueous emulsion of an organopolysiloxane having a substantial amount of mercapto-substituted monovalent hydrocarbon groups bonded to the silicon atoms.

5 Claims, No Drawings

METHOD FOR THE PREPARATION OF AN ACRYLIC POLYMER MODIFIED WITH AN ORGANOPOLYSILOXANE

This application is a continuation of U.S. application Ser. No. 07/154,899, filed Feb. 11, 1988, now abandoned.

BACKGROUND OF THE INVENTION

The present invention relates to a method for the preparation of an acrylic polymer modified with an organopolysiloxane or, more particularly, to a method for the preparation of an acrylic polymer modified with an organopolysiloxane capable of giving a rubber having remarkably improved heat and cold resistance, oil resistance and mechanical strengths and useful as a material for sealings, O-rings, gaskets, hoses, electric wire sheaths and the like.

Needless to say, organopolysiloxanes in general have excellent heat and cold resistance and weatherability as well as good electric properties so that silicone rubbers formulated with an organopolysiloxane as the base polymer are widely used in a variety of industrial applications. Silicone rubbers are, however, not free from several problems and disadvantages including the relatively poor oil resistance to show considerable swelling in oils even after full curing by crosslinking with an organic peroxide as a curing agent because the principal ingredient of the silicone rubber compounds is a dimethylpolysiloxane which is soluble in many organic solvents including gasoline, rubber solvents and the like. This disadvantageous property of silicone rubbers can be improved by introducing, for example, 3,3,3-trifluoropropyl groups into the organopolysiloxane molecules as the pendant groups to the polysiloxane chain although the practicability of this means is questionable or limited because of the greatly increased costs for the preparation of such a special organopolysiloxane.

On the other hand, acrylic rubbers are promising as a material for automobiles by virtue of their excellent heat resistance and oil resistance but the cold resistance thereof is relatively poor so that it is eagerly desired to develop an acrylic rubber improved in respect of the cold resistance.

Accordingly, several attempts and proposals have been made to combine a silicone rubber and an acrylic rubber each to compensate the defects in the other. For example, Japanese Patent Kokai 55-7814 and 60-152552 have made a proposal to compound an uncrosslinked organopolysiloxane and an uncrosslinked acrylic rubber with a copolymer obtained by the copolymerization of an organopolysiloxane having aliphatically unsaturated hydrocarbon groups and an ester of acrylic acid so as to obtain a rubber blend having good miscibility and workability and capable of being cured with an organic peroxide as the curing agent. Because the copolymer compounded with the organopolysiloxane and acrylic rubber is a product of the copolymerization between the silicon-bonded aliphatically unsaturated groups, e.g., vinyl groups, and the acrylic groups in the acrylic ester, the copolymer is sometimes gelled when the molecular weight thereof is sufficiently high. Moreover, the desired improvement by the addition of this copolymer is obtained only with a large amount of addition thereof while a rubber blend compounded with a large amount of the copolymer has a problem in the behavior of vulcanization not to give a vulcanizate having sufficiently high mechanical strengths because the copolymer is not co-vulcanizable with the other rubbery components by use of an organic peroxide due to the absence of any functional points pertaining to the crosslinking reaction such as aliphatically unsaturated groups.

SUMMARY OF THE INVENTION

The present invention accordingly has an object to provide a novel method for the preparation of an acrylic polymer modified with an organopolysiloxane and capable of giving a rubber vulcanizate without the above described problems and disadvantages in the prior art.

Thus, the method of the present invention for the preparation of an acrylic polymer modified with an organopolysiloxane comprises the steps of:

(A) emulsifying an organopolysiloxane represented by the average unit formula $$R_a SiO_{(4-a)/2}. \tag{I}$$

in which R is a substituted or unsubstituted monovalent hydrocarbon group and the subscript a is a positive number in the range from 1.98 to 2.001, from 0.025% to 10% by moles of the groups denoted by R in a molecule being mercapto-substituted monovalent hydrocarbon groups, in an aqueous medium to give an aqueous emulsion of the organopolysiloxane;

(B) adding a monomer mixture composed of 100 parts by moles of an ester of acrylic acid as the first acrylic monomer and from 0.1 to 10 parts by moles of a second acrylic monomer having, in a molecule, an acrylic unsaturated group and at least one aliphatically unsaturated hydrocarbon group other than acrylic group and a radical polymerization initiator to the aqueous emulsion of the organopolysiloxane to give a polymerization mixture; and (C) dispersing the monomer mixture into the aqueous emulsion to effect copolymerization of the monomers.

DETAILED DESCRIPTION OF THE PREFERRED EMBODIMENTS

As is described above, the inventive method is characterized by the polymerization of an acrylic monomer mixture in an aqueous emulsion of a mercapto-substituted organopolysiloxane. By virtue of the high reactivity of the mercapto groups in a free-radical chain reaction, the mercapto-containing organopolysiloxane pertains to the copolymerization of the acrylic monomers to give an organopolysiloxane-modified acrylic polymer which is imparted with high cold resistance along with heat resistance and weatherability. Moreover, the combined use of the second acrylic monomer has an effect to impart the resultant organopolysiloxane-modified acrylic polymer with co-vulcanizability of the organopolysiloxane moiety and the acrylic moiety so that the vulcanizate of the polymer may have greatly improved mechanical strengths in contrast to conventional silicone-modified acrylic rubbers from which vulcanizates having high mechanical strengths can hardly be obtained due to the lack of co-vulcanizability of the organopolysiloxane moiety and the acrylic moiety each crosslinked by a different mechanism from the other.

One of the starting materials in the inventive method is an organopolysiloxane represented by the average unit formula $$R_aSiO_{(4-a)/2}.$$

in which R is a substituted or unsubstituted monovalent hydrocarbon group bonded to the silicon atom and the subscript a is a positive number in the range from 1.98 to 2.001. Examples of the unsubstituted monovalent hydrocarbon group denoted by R include alkyl groups, e.g., methyl, ethyl, propyl, butyl and octyl groups, alkenyl groups, e.g., vinyl and allyl groups, aryl groups, e.g., phenyl and tolyl groups, and cycloalkyl groups, e.g., cyclohexyl group. The group denoted by R may be a substituted monovalent hydrocarbon group obtained by replacing a part or all of the hydrogen atoms in the above noted hydrocarbon groups with substituent atoms or groups such as halogen atoms, cyano groups, mercapto groups and the like. In particular, it is essential in the inventive method that from 0.025% to 10% by moles or, preferably, from 0.10% to 5% by moles of the groups denoted by R in a molecule are mercapto-substituted monovalent hydrocarbon groups such as 3-mercaptopropyl group in order that the organopolysiloxane may pertain to the copolymerization reaction of the acrylic monomers. When the proportion of the mercapto-substituted groups is too small, the degree of modification of the acrylic polymer with the organopolysiloxane is insignificant not to impart the vulcanizate of the resultant copolymer with fully improved mechanical strengths. When the proportion of the mercapto-substituted groups is excessively high, on the other hand, the siloxane linkages of the organopolysiloxane may be subject to scission by the interaction with the mercapto groups to effect the heat resistance of the resultant copolymer.

It is further preferable that a part of the groups denoted by R are alkenyl groups such as vinyl groups which contribute to the increase in the crosslinking density in the vulcanizate to improve the mechanical properties. The content of the vinyl groups as R, however, should not exceed 10% by moles or, preferably, should be in the range from 0.025% to 1.0% by moles because an excessively high content of the vinyl groups may result in an unduly high crosslinking density to cause some brittleness of the vulcanizate.

The molecular structure of the organopolysiloxane is preferably straightly linear although the organopolysiloxane may have a branched or network-like structure to a limited extent without particularly adverse influences. The average degree of polymerization of the organopolysiloxane is usually in the range from 100 to 10,000 or, preferably, from 4000 to 8000. When an organopolysiloxane having an excessively high degree of polymerization is used as a starting material, some difficulties are caused in the compounding works of the copolymer with a filler. The type of the terminal groups at the molecular chain ends is not particularly limitative including trimethyl silyl, dimethyl vinyl silyl, 3-mercaptopropyl dimethyl silyl, silanolic hydroxy and silicon-bonded alkoxy, e.g., methoxy, groups.

The first step of the inventive method is emulsification of the above described organopolysiloxane in an aqueous medium. The process of emulsification can be performed in a conventional manner without particular difficulties by adding and vigorously agitating the organopolysiloxane in an aqueous medium containing an emulsifier. Alternatively, an equally usable aqueous emulsion of an organopolysiloxane can be obtained by the emulsion polymerization of a low-molecular organopolysiloxane in an aqueous medium containing an acidic surface active agent such as a long-chain alkyl benzene sulfonic acid. The content of the organopolysiloxane in the aqueous emulsion is preferably in the range from 30 to 50% by weight in view of the stability of the emulsion and the efficiency of production.

In the second step of the inventive method, a combination of acrylic monomers is added to the above described aqueous emulsion of the organopolysiloxane. The first acrylic monomer is selected from the group consisting of alkyl acrylates, e.g., methyl acrylate, ethyl acrylate and butyl acrylate, alkoxyalkyl acrylates, e.g., 2-methoxyethyl acrylate and 2-ethoxyethyl acrylate, alkylthio acrylates, cyanoalkyl acrylates and the like. It is essential in the inventive method that the first acrylic monomer is used in combination with a second monomer having, in a molecule, at least one non-acrylic unsaturated hydrocarbon group such as, preferably, vinyl and allyl groups. It is more preferable that the second monomer has an acrylic unsaturated group in a molecule in addition to the above mentioned non-acrylic unsaturation.

Examples of the second monomer include diene monomers, e.g., butadiene, isoprene, pentadiene, ethylidene norbornene, dicyclopentadienyl acrylate and vinylidene norbornene, and (meth)acryloxy-substituted organosilicon compounds having at least one vinylsilyl group exemplified by vinyl dimethyl silylmethyl acrylate $CH_2=CH-CO-O-CH_2-SiMe_2Vi$, vinyl methyl phenyl silylpropyl acrylate $CH_2=CH-CO-O-C_3H_6-SiMePhVi$ and vinyl dimethyl silylmethyl methacrylate $CH_2=CMe-CO-O-CH_2-SiMe_2Vi$ as well as cyclotetrasiloxane compounds represented by the general formula

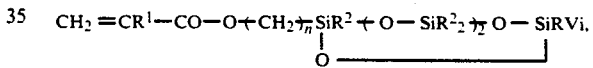

in which R has the same meaning as defined above, $R^1$ is a hydrogen atom or a methyl group and $R^2$ is a hydrogen atom or R, denoting methyl, vinyl and phenyl groups by the symbols Me, Vi and Ph, respectively. In particular, a cyclotetrasiloxane compound in conformity with the above given definition is commercially available with a tradename of AV-100 (a product of Shin-Etsu Chemical Co.) which has a structure of the formula

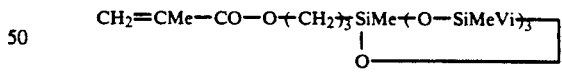

The amount of the above defined second monomer, which is preferably also acrylic, added to the aqueous emulsion of the organopolysiloxane is usually in the range from 0.1 to 10% by moles or, preferably, from 0.10 to 5% by moles based on the amount of the first acrylic monomer. When the amount of the second acrylic monomer is too small, no sufficiently high crosslinking density can be obtained in the vulcanizate obtained by use of an organic peroxide as the vulcanizing agent not to improve the mechanical strengths of the vulcanizate. When the amount of the second acrylic monomer is too large, the crosslinking density is unduly high also to affect the mechanical properties of the vulcanizate.

An also important factor influencing the property of the resultant organopolysiloxane-modified acrylic polymer is the proportion of the organopolysiloxane moiety and the acrylic moiety in the organopolysiloxane-modified acrylic polymer. In this regard, the polymerization mixture should contain the emulsified organopolysiloxane and the acrylic monomers in a weight ratio in the range from 90:10 to 10:90 or, preferably, from 50:50 to 10:90.

The copolymerization reaction of the acrylic monomers in the presence of the emulsified organopolysiloxane in the polymerization mixture is performed by use of a radical polymerization initiator exemplified by water-soluble ones such as ammonium persulfate, potassium persulfate and hydrogen peroxide and monomer-soluble ones, of which the temperature to give a half-period of 10 hours does not exceed 80° C., such as benzoyl peroxide, lauroyl peroxide, azobisisobutyronitrile and diisopropylperoxy dicarbonate.

The polymerization temperature, which is in the range from 0° to 80° C., naturally depends on the kind of the polymerization initiator. For example, the polymerization reaction can be performed at 40° C. or below by use of a so-called redox-type initiator system of a combination of the above mentioned peroxide-type initiator and a reducing agent such as a combination of the persulfate or hydrogen peroxide and iron (II) sulfate as a water-soluble initiator system and a combination of benzoyl peroxide and N,N-dimethyl aniline as a monomer-soluble initiator system. The polymerization mixture in the form of an aqueous emulsion after completion of the polymerization reaction is then subjected to salting-out by adding a salt such as calcium chloride thereto so as to coagulate the acrylic polymer into a coagulated mass which is separated from the aqueous medium by decantation and filtration followed by washing with water and drying to give the desired organopolysiloxane-modified acrylic polymer.

The thus obtained organopolysiloxane-modified acrylic polymer is composed of the organopolysiloxane moiety and the acrylic moiety still having non-acrylic unsaturated hydrocarbon groups so that the polymer is vulcanizable by heating in the presence of a radical-producing agent such as an organic peroxide to give a covulcanizate having excellent rubbery mechanical properties along with greatly improved heat and cold resistance and weatherability. Accordingly, the organopolysiloxane-modified acrylic polymer as a product of the inventive method is an industrially useful material for manufacturing various kinds of sealings, O-rings, gaskets, electric wire sheaths and the like.

In the following, the method of the invention is described in detail by way of examples.

EXAMPLES AND COMPARATIVE EXAMPLES

A stable aqueous emulsion was prepared by adding 1500 g of octamethyl cyclotetrasiloxane, 2.62 g of 1,3,5,7-tetravinyl-1,3,5,7-tetramethyl cyclotetrasiloxane, 0.47 g of 1,1,3,3-tetramethyl-1,3-divinyl disiloxane and 40.8 g of a 3-mercaptopropyl methyl polysiloxane having a viscosity of 35 centistokes at 25° C., of which the content of the mercapto groups SH was at least 21.0% by weight and the content of silanolic hydroxy groups did not exceed 0.40 mole/100 g, to 1500 g of pure water containing 15 g of sodium lauryl sulfate and 10 g of dodecylbenzene sulfonic acid and vigorously agitating the mixture by use of a homomixer followed by passing the emulsion twice through a homogenizer.

The emulsion was then heated at 70° C. for 12 hours followed by cooling to room temperature and kept standing for 24 hours. The emulsion was then neutralized to have a pH of 7 with addition of sodium carbonate and, after bubbling of nitrogen gas for 4 hours, subjected to steam distillation to remove volatile matters followed by dilution with addition of pure water in such an amount that the resultant emulsion contained 33% by weight of the non-volatile matter. The organopolysiloxane in the thus obtained aqueous emulsion, which is referred to as the emulsion E-1 hereinbelow, contained 0.75% by moles and 0.0875% by moles of 3-mercaptopropyl groups and vinyl groups, respectively, based on the overall organic groups, the balance being methyl groups.

Three more aqueous organopolysiloxane emulsions, referred to as the emulsions E-2, E-3 and E-4 hereinbelow, were prepared in substantially the same manner as in the preparation of the emulsion E-1 excepting omission of the 1,3,5,7-tetravinyl-1,3,5,7-tetramethyl cyclotetrasiloxane and 1,1,3,3-tetramethyl-1,3-divinyl disiloxane for the emulsion E-2, replacement of a half amount of 1500 g of the octamethyl cyclotetrasiloxane with 750 g of 1,3,5-trimethyl-1,3,5-tris(3,3,3-trifluoropropyl) cyclotrisiloxane for the emulsion E-3 and, for comparison, omission of the 3-mercaptopropyl methyl polysiloxane for the emulsion E-4. The content of the 3-mercaptopropyl groups in the organopoly-siloxanes contained in the emulsions other than E-4 and the content of the vinyl groups in the organopolysiloxanes contained in the emulsions other than E-2 were 0.75% by moles and 0.0875% by moles, respectively, based on the overall amount of the silicon-bonded organic groups.

Into a three-necked flask of 1 liter capacity equipped with a stirrer, condenser, thermometer and a gas inlet tube connected to a nitrogen gas source were introduced 214 g of the emulsion E-1 containing 70.6 g of the organopolysiloxane, 2 g of sodium lauryl sulfate and 120 g of pure water and the mixture in the flask was cooled to 10° C. under a stream of nitrogen gas followed by addition of 0.975 g of tert-butyl hydroperoxide, 0.750 g of sodium pyrophosphate decahydrate, 1.5 g of glucose and 0.010 g of iron (II) sulfate heptahydrate. Thereafter, a mixture of 277 g of ethyl acrylate and 2.8 g of the methacrylic vinyl-containing cyclic organopolysiloxane compound AV-100 described before was added dropwise into the mixture in the flask over a period of 3 hours followed by further continued agitation of the mixture kept at 25° C. for additional 1 hour to complete the polymerization reaction. The aqueous emulsion was then admixed with a saturated aqueous solution of calcium chloride to coagulate the polymer into a mass which was separated from the aqueous medium by filtration followed by washing with water and drying to give 350 g of an organopolysiloxane-modified acrylic polymer, which is referred to as the polymer P-1 hereinbelow.

Three more organopolysiloxane-modified acrylic polymers, referred to as the polymers P-2, P-3 and P-4 hereinbelow, were prepared in substantially the same manner as above excepting replacement of the emulsion E-1 with the emulsions E-2, E-3 and E-4, respectively. The acrylic monomer mixture in each of the above described polymerization runs contained 1% by weight of AV-100. For comparison, a further organopolysiloxane-modified acrylic polymer, referred to as the polymer P-5 hereinbelow, was prepared in substantially the same manner as in the preparation of P-1 excepting omission of AV-100 in the formulation of the polymerization mixture.

The thus obtained organopolysiloxane-modified acrylic polymers P-1 to P-5 had a Mooney viscosity $ML_{1+4}$ (100° C.) of 45, 55, 44, 65 and 51, respectively. Each of the polymers other than P-4 had good processability by rolling to show ready winding around the roll and easy compounding with various rubber additives while the polymer P-4 could hardly be milled on the roll to show slipping on the roll and breaking into crumbles falling from the roll. Further, the vulcanizability of the polymers P-1, P-2, P-3 and P-5 was evaluated by admixing each polymer with 2% by weight of a silicone fluid-based pasty mixture containing 60% by weight of dicumyl peroxide and curing the mixture at 155° C. for 10 minutes under compression to find that the polymers P-1, P-2 and P-3 could be cured into a rubber sheet while the polymer P-5 gave no satisfactory cured rubber sheet due to blistering.

Three vulcanizable acrylic rubber compounds were prepared each by uniformly compounding, on a two-roller mill, 100 parts by weight of either one of the polymers P-1, P-2 and P-3 with 40 parts by weight of a finely divided fumed silica filler (Aerosil 200, a product by Nippon Aerosil Co.), 1 part by weight of stearic acid, 5 parts by weight of an active zinc oxide and 5 parts by weight of a dimethyl silicone fluid terminated at each molecular chain end with a silanolic hydroxy group corresponding to a content of 3% by weight and by further continued milling for 30 minutes with the rolls heated at 110° C. to remove the moisture in the silica filler followed by cooling to room temperature and admixing of 2 parts by weight of a silicone fluid-based pasty mixture containing 65% by weight of tert-butyl cumyl peroxide. The rubber compounds were each cured into a rubber sheet having a thickness of 2 mm by heating first at 165° C. for 10 minutes under compression and then at 180° C. for 2 hours in a hot-air oven. The cured rubber sheets were subjected to the measurement of physical properties according to the procedure specified in JIS K 6301 to give the results shown in Table 1 below.

For comparison, two more rubber compounds were prepared in the same formulation as above except that the organopolysiloxane-modified acrylic polymer was replaced with a gum-like vinyl-containing dimethylpolysiloxane having an average degree of polymerization of about 7000, of which the content of the vinyl groups was 0.0875% by moles based on the overall silicon-bonded organic groups, referred to as silicone hereinbelow, or an ethyl acrylate polymer having an average molecular weight of about 1,500,000 with admixture of 1% by weight of the above mentioned AV-100, referred to as "acrylic" hereinbelow. Table 1 below also shows the results of the tests of the physical properties carried out with vulcanizate sheets of these polymers.

The results shown in Table 1 lead to conclusions that introduction of mercapto groups into the organopolysiloxane moiety along with vinyl groups is very effective in improving the tear strength of the rubber vulcanizate as cured over silicone rubbers, that introduction of 3,3,3-trifluoropropyl groups into the organopolysiloxane is effective in improving the oil resistance of the vulcanizate over silicone rubbers and that the vulcanizates compounded with the polymer obtained according to the inventive method have improved heat and cold resistance over acrylic rubbers.

TABLE 1

| Polymer | P-1 | P-2 | P-3 | Silicone | Acrylic |
|---|---|---|---|---|---|
| As cured | | | | | |
| Hardness, JIS | 63 | 60 | 62 | 56 | 65 |
| Ultimate elongation, % | 420 | 600 | 450 | 457 | 580 |
| Tensile strength, kg/cm² | 120 | 90 | 112 | 108 | 115 |
| Tear strength, kg/cm | 45 | 26 | 43 | 21 | 40 |
| Permanent compression set, %, after 220 hours at 150° C. | 45 | 48 | 46 | 15 | 30 |
| Increment after thermal aging at 175° C. for 22 hours | | | | | |
| Hardness, JIS | +8 | +7 | +8 | ±0 | +10 |
| Ultimate elongation, % | −10 | −26 | −12 | −2 | −30 |
| Tensile strength, % | +12 | +12 | +11 | +2 | +10 |
| Oil resistance after 72 hours at 150° C. in #3 oil | | | | | |
| Volume increase, % | +22 | +24 | +14 | +45 | +14 |
| Weight increase, % | +16 | +17 | +9 | +35 | +10 |
| Brittle-point temperature, °C. | −39 | −38 | −40 | −75 | −5 |

What is claimed is:

1. A vulcanizable acrylic polymer modified with an organopolysiloxane, said polymer being composed of an organopolysiloxane moiety copolymerized with a first acrylic monomer and a second acrylic monomer; said organopolysiloxane moiety being represented by the average unit formula:

$$R_a SiO_{(4-a)/2},$$

in which R is a substituted or unsubstituted monovalent hydrocarbon group and the subscript a is a positive number in the range of from 1.98 to 2.001, from 0.025% to 10% by moles of the groups denoted by R in a molecule being mercapto-substituted monovalent hydrocarbon groups; said first acrylic monomer being an ester of acrylic acid and said second acrylic monomer having, in a molecule, an acrylic unsaturated group and at least one vinyl group; said second acrylic monomer being represented by the general formula:

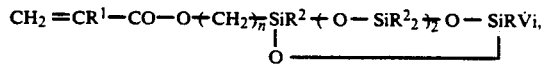

in which Vi is a vinyl group, R has the same meaning as defined above, R¹ is a hydrogen atom or a methyl group and R² is a hydrogen atom or R.

2. A polymer as claimed in claim 1 wherein the second acrylic monomer is a compound expressed by the structural formula

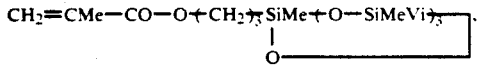

in which Me is a methyl group.

3. A polymer as claimed in claim 1 wherein the weight proportion of the amount of the acrylic monomers to the amount of organopolysiloxane is in the range from 10:90 to 90:10.

4. A polymer as claimed in claim 1 wherein the first acrylic monomer is selected from the group consisting of alkyl acrylates, alkyoxyalkyl acrylates, alkylthio acrylates and cyanoalkyl acrylates.

5. A polymer as claimed in claim 4 wherein the first acrylic monomer is an alkyl acrylate.

* * * * *